(No Model.)
S. W. ALBERTSON.
BRAKE FOR VEHICLES.
No. 374,230. Patented Dec. 6, 1887.
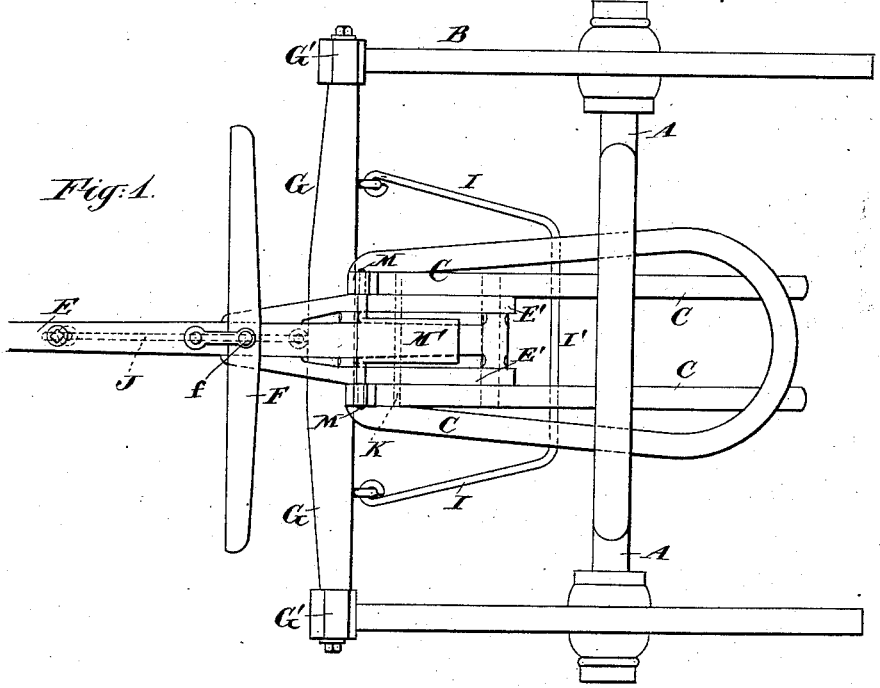
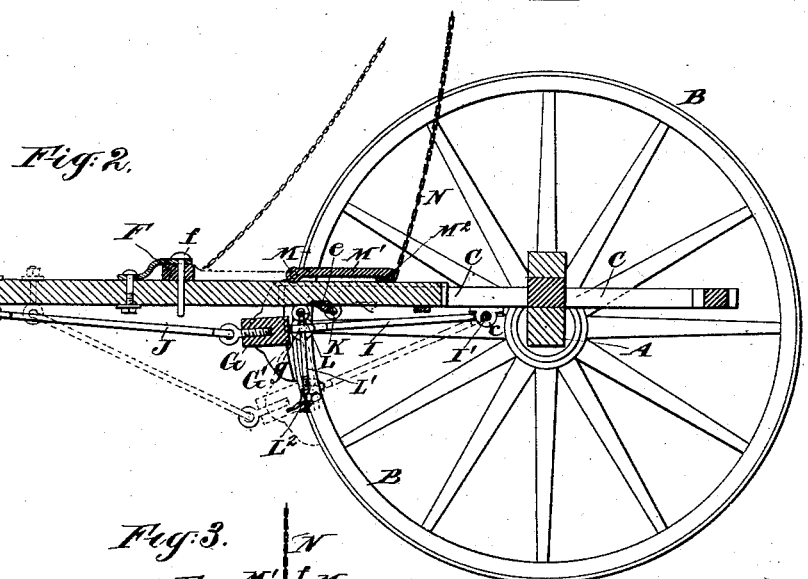
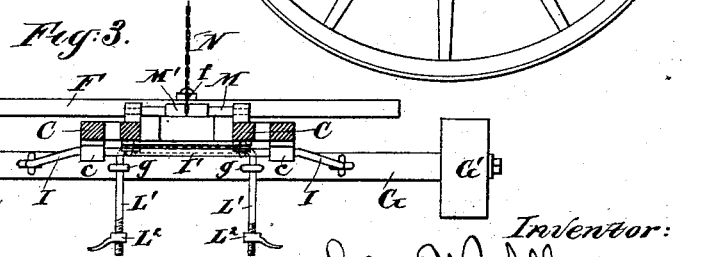
Witnesses:
Charles R. Searle,
M. F. Boyle
Inventor:
Silas W. Albertson
by his attorney
Thomas Drew Stetson

UNITED STATES PATENT OFFICE.

SILAS W. ALBERTSON, OF ROSLYN, NEW YORK.

BRAKE FOR VEHICLES.

SPECIFICATION forming part of Letters Patent No. 374,230, dated December 6, 1887.

Application filed August 27, 1887. Serial No. 248,047. (No model.)

*To all whom it may concern:*

Be it known that I, SILAS W. ALBERTSON, of Roslyn, in the county of Queens and State of New York, have invented a certain new and useful Improvement in Brakes for Carriages, of which the following is a specification.

The invention is intended, mainly, for use in heavy wagons for teaming, farming, and analogous purposes; but it may be applied to carriages of any weight adapted for any use. I will describe it as applied to a heavy farm-wagon drawn by two horses. The rear end of the pole is wide and adapted to slide backward and forward between parallel inner faces of the hounds. A brake-bar, carrying brake-blocks to press on the forward wheels, extends across below, and is so connected by links to the pole and to the hounds attached to the axle that while the pole is held forward the brakes will be of no effect; but on the pole being moved backward with sufficient force the brakes will be brought into contact with the wheels. The links by which the brake-bar is connected rearward to the hounds connect to points out of the center line of the wheels, so that the friction of the wheels by impelling the brake-blocks and brake-bar downward applies the brakes forcibly. This effect obtains so long as the carriage is moving forward; but when the carriage has stopped any force applied by the horses to back the carriage will by tending to induce a movement of the wheels in the reverse direction cause the friction to lift the brake-bar and bring the blocks out of contact with the wheels. This prevents the brakes from ever being very forcibly opposed to a backing movement.

I have further provided for backing by so locking the tongue that it cannot be moved back. Thus locked the brake-blocks are kept entirely out of contact with the wheels, and the entire force of the horses is applied in moving the wagon or other carriage backward with the same effect as with ordinary carriages.

I provide means for holding the tongue with gentle force sufficiently forward to prevent the brakes from acting. On good roads there is much of the time when the way is level or slightly descending that the horses do not pull the carriage, and yet it is desirable to keep the brakes off the wheel. My provision attains this.

I also provide means for arresting the force with which the brake is applied. The provisions for applying the brakes more and more forcibly by the friction of the wheels so soon as they are engaged therewith are liable to put on the brakes with an excess of force, so as to induce mischief by a too sudden stop, or even at a high velocity with a heavy load to break some of the parts. I provide means for conveniently limiting the point to which the brake-bar can move downward, and consequently the force with which the brakes can be applied. It will be observed that my arrangement of the parts transmits the force of the hauling of the wagon through the brake-bar and its connected links. A holding back by the animals allows the brakes to be applied first by gravity, and then through the oblique position of the links the brakes are further applied by the friction due to the motion of the wheels themselves. When the animals pull, the tension thus exerted tends to straighten the links and to hold the brake-blocks out of contact with the wheels. My provision for gently holding the tongue forward prevents the brakes from being applied by a mere relaxing of the holding force.

The accompanying drawings form a part of this specification, and represent what I consider the best means of carrying out the invention.

Figure 1 is a plan view. Fig. 2 is a central longitudinal section, and Fig. 3 a vertical cross-section, of a portion seen from the rear.

Similar letters of reference indicate corresponding parts in all the figures where they occur.

A is the axle, B B are the front wheels, and C C the hounds, all being connected in any ordinary or suitable manner to a stout wagon-body. (Not represented.)

E is the draft-pole, made wide and with parallel sides E' at and near the rear end where it fits loosely between the front ends of the hounds C. As ordinarily conditioned, it is free to slide forward and backward to operate the brakes.

G is the brake-bar, extending across below the pole E, directly in front of and close to the wheels. It carries brake-blocks G' G', adapted to press against the wheels, and is provided with stout eyes which connect it with links I and J, extended in inclined positions forward and back. One set of links, I, united in a single piece by a cross-piece, I', extend upward and backward and connect to eyes on the hounds C. Another link, J, extends upward and forward from the center and connects to an eye on the pole E. When the horses pull forward, the tension transmitted through the inclined links I and the inclined link J acts in the obvious manner to raise and hold up the brake-bar G and its attached blocks G', and by reason of the elevated position of the parts, the brake-blocks are held out of contact with the wheels; but when in descending a hill the horses hold back on the wagon, the force of holding back first slides the pole E rearward and allows the brake-bar to sink, and immediately afterward brings into play a new element by the stronger descending motion of the brake-bar due to the motion of the wheels communicated through friction. The eyes $c\,c$, by which the links I connect to the hounds C, are not in the center of the axle, but considerably forward and a little above the center. It follows that as the brake-bar descends the blocks G' describe arcs not coincident with the peripheries of the wheels. The arcs are described about the center $c$, forward of the centers of the wheels. It follows that a lowering of the brake-blocks presses them forcibly against the wheels, and that a raising of the blocks takes them out of contact with the wheels. The effect of the friction of the wheels against the blocks under these conditions is very marked. When the wagon is descending a steep hill and the horses hold back on the pole, it moves the latter back enough to depress the brake-bar G, and causes the brake-blocks G' to press with some force against the wheels; but the backward thrust on the pole due to the horses is not the only force actuating the brakes. So soon as the blocks G' G' fairly touch against their respective wheels the contact induces friction, which tends to move the brake-blocks in the same direction as that portion of the wheel is moving, which is downward, and thus the friction force is added to the force received from the horses to put on the brakes tighter and tighter. When the hill is completely descended, or preferably a little before, the horses should be started actively forward, and their pull on the pole moves it forward, taking off that portion of the force before due to the holding back of the horses, and overcoming that portion due to the friction and again lifting the blocks G' to their original positions, out of contact with the wheels.

K is a round bar of iron fixed to the hounds and extending transversely across under the pole. A notch, $e$, formed in the base of the pole E, receives this bar when the pole is in or near its extreme forward position. The notch will hold the pole in such position that the brake-blocks will be out of contact with the wheels. The parts so remain under all ordinary conditions. The jolting and other slight forces incident to the movements of the animals and the irregularities of the road will not move the pole backward, and the brake-blocks will remain out of contact with the wheels under all ordinary conditions; but so soon as any considerable force is exerted by the animals on the pole in holding back on the carriage it will urge the pole rearward with sufficient force to lift it a little and free itself from its engagement with the cross-bar K. Then it will move backward strongly and apply the brakes. On again starting forward the team, the pole moves forward until the notch $e$ again engages with the cross-bar K, and the wagon moves without hinderance from the brake, as before.

L is a bar extending across the hounds and fastened thereto at the point represented.

L' are links depending one from each end of the bar L. These extend down loosely through eyes $g$ on the brake-bar G, and are threaded at their lower ends to receive the hand-nuts $L^2$. These nuts receive the eyes $g$ when the brake-bar is sufficiently depressed and prevent it from ever moving too low. The point to which the brake-bar may be depressed on each side, and consequently the force with which the brake-block on that side may be applied, can be regulated by the attendant at will by simply turning the nuts $L^2$. The wear of the brake-blocks G' will require that these nuts be slackened from time to time as the wagon is used.

M is a cross-shaft extending across over the pole and supported in eyes near the forward ends of the hounds.

M' is a dog carried on the shaft M. A chain, N, leads down from a point on the wagon convenient to the driver, and is attached to an eye at $M^2$ on the dog. When under circumstances frequently occurring in practice it is required to back the wagon by the action of the horses, the driver will give a smart quick pull to the chain N and immediately relax it again. This will induce a turning completely over or a half-revolution of the dog M', and cause it to abut its end against the rear face of the doubletree F, which is pivoted strongly to the pole at $f$. In this position it holds the pole firmly forward. The horses may exert any amount of force in backing without applying the brakes.

The peculiar effect with my mechanism, due to friction, makes it possible to back under favorable circumstances without taking the trouble to thus fling over the dog M'. Whenever without such preliminary the horses are backed on a level and smooth ground, the backing force will bring the brakes gently into contact with the wheels; but as the wheels are not in forward motion all that part of the force which in descending a hill is due to the friction of the wheels on the brakes dragging the brake-blocks downward will not be realized. There will be no force applying the brakes except that due to the effort of the horses thrusting backward on the pole. As soon as the wagon begins to move backward, the motion of the wheels will tend to lift the brake-bar and thus to diminish instead of to increase the force. It follows that although the brakes will offer some resistance to backing it will not be nearly as great as that offered to resist a forward motion.

Modifications may be made in the details without departing from the principle or sacrificing the advantages of the invention. The eyes c c are shown as held in position by bolts engaging with the hounds; but this may be varied. It is only necessary that they be strongly and reliably supported, and that they be about in the position shown, so as to induce the required action of the brakes by the rising and sinking of the brake-bar or equivalent support of the brake-blocks. The links I I and cross-bar I' may be made in a single piece, or the links I I and cross-bar I' may be made in separate pieces. I prefer to make the latter in a single piece for the reason, among others, that it braces the brake-bar against lateral and twisting movements.

I attach importance to the fact that the force of the hauling is transmitted through the brake mechanism.

I claim as my invention—

1. In combination with the wheels B, brake-blocks G', and the links I and J, and pole E, for applying the brakes with a force due in part to the friction of the wheels thereon, the transverse bar K, engaging a notch in the tongue with gentle force to hold the brakes out of engagement with the wheels under ordinary conditions, as herein specified.

2. In combination with wheels B, brake-blocks G', and means, as the shifting pole E and links I J, for applying the brakes with a force due in part to the friction of the wheels thereon, the links L', and adjustable stops or nuts L², for limiting the force with which the brakes may be applied, as herein specified.

In testimony whereof I have hereunto set my hand, at Roslyn, New York, this 19th day of August, 1887, in the presence of two subscribing witnesses.

SILAS W. ALBERTSON.

Witnesses:
ALBERT B. WILSON,
WILLIAM W. WOOD.